(12) United States Patent
Laroia et al.

(10) Patent No.: US 8,000,687 B2
(45) Date of Patent: *Aug. 16, 2011

(54) WIRELESS TERMINAL LOCATION USING APPARATUS AND METHODS EMPLOYING CARRIER DIVERSITY

(75) Inventors: Rajiv Laroia, Basking Ridge, NJ (US); Junyi Li, Bedminster, NJ (US)

(73) Assignee: Qualcomm Incorporated, San Diego, CA (US)

(*) Notice: Subject to any disclaimer, the term of this patent is extended or adjusted under 35 U.S.C. 154(b) by 937 days.

This patent is subject to a terminal disclaimer.

(21) Appl. No.: 11/761,351

(22) Filed: Jun. 11, 2007

(65) Prior Publication Data

US 2007/0232327 A1 Oct. 4, 2007

Related U.S. Application Data

(63) Continuation-in-part of application No. 11/249,015, filed on Oct. 12, 2005, now Pat. No. 7,233,800.

(60) Provisional application No. 60/618,669, filed on Oct. 14, 2004.

(51) Int. Cl.
*H04L 29/06* (2006.01)

(52) U.S. Cl. ............... 455/414.1; 455/414.2; 455/414.3; 455/456.1; 455/456.2

(58) Field of Classification Search .............. 455/414.1, 455/414.2, 414.3, 456.1, 456.2, 456.3
See application file for complete search history.

(56) References Cited

U.S. PATENT DOCUMENTS

| | | | | |
|---|---|---|---|---|
| 6,167,273 | A * | 12/2000 | Mandyam | 455/450 |
| 6,175,550 | B1 * | 1/2001 | van Nee | 370/206 |
| 6,334,059 | B1 | 12/2001 | Stilp et al. | |
| 2002/0115459 | A1 * | 8/2002 | Chuang et al. | 455/522 |
| 2003/0111007 | A1 | 6/2003 | Takamatsu et al. | |
| 2003/0144007 | A1 | 7/2003 | Johansson et al. | |
| 2003/0157936 | A1 | 8/2003 | Ohtani et al. | |
| 2005/0136845 | A1 | 6/2005 | Masuoka et al. | |

(Continued)

FOREIGN PATENT DOCUMENTS

JP      03104328       5/1991

(Continued)

OTHER PUBLICATIONS

International Search Report and Written Opinion—PCT/US2005/036292. , International Search Authority. European Patent Office, May 31, 2006.

*Primary Examiner* — Patrick N Edouard
*Assistant Examiner* — Julio Perez
(74) *Attorney, Agent, or Firm* — Howard H. Seo

(57) ABSTRACT

Wireless terminals, e.g., mobile nodes, receive, identify, and measure broadcast signals from a plurality of cells. They determine relative transmission power relationships corresponding to the received measured signals and determine at least two channel gain ratios. A geographic area is determined corresponding to the obtained at least two channel gain ratios and information indicating the geographic region in which such gain ratios may be detected. Each cell's base station transmits broadcast signals, e.g., beacon signals, pilot signals, and/or assignment signals for one more carriers. Some base stations use multiple carriers at different power levels. Some adjacent cells use different power levels for the same carrier. This carrier diversity approach tends to reduce overall interference in the system, yet provides mobiles with a variety of different strength signals which may be monitored and which vary as a function of distance from the source transmitter.

35 Claims, 11 Drawing Sheets

U.S. PATENT DOCUMENTS

2006/0019694 A1* 1/2006 Sutivong et al. ............. 455/522

FOREIGN PATENT DOCUMENTS

| | | |
|---|---|---|
| JP | 0451618 | 2/1992 |
| JP | 0865729 | 3/1996 |
| JP | 0980144 | 3/1997 |
| JP | 2000308114 | 11/2000 |
| JP | 2001235337 | 8/2001 |
| WO | WO02082832 | 10/2002 |

* cited by examiner

US 8,000,687 B2

WIRELESS TERMINAL LOCATION USING APPARATUS AND METHODS EMPLOYING CARRIER DIVERSITY

RELATED APPLICATIONS

The present application is a continuation of U.S. patent application Ser. No. 11/249,015, filed on Oct. 12, 2005, which claims the benefit of U.S. Provisional Patent Application Ser. No. 60/618,669, filed on Oct. 14, 2004. Each of the preceding applications is hereby expressly incorporated by reference.

FIELD OF THE INVENTION

The present invention relates to methods and apparatus for wireless terminal location determination and, more particularly, methods and apparatus for determination location based on signals received from different base stations.

BACKGROUND

It is desirable to be able to locate wireless communication devices for a variety of reasons, e.g., emergencies, navigation functions, law enforcement tracking, delivery tracking. It is also beneficial for a wireless system network service provider to be able to locate and track customer activity. Such collected and correlated information would be useful in identifying problem locations of poor reception within the system and in making decisions regarding the deployment of additional components and capabilities for the system. One approach of tracking a wireless terminal (WT) is to embed a Global Positioning Satellite (GPS) receiver within the WT. This requires additional specialized circuitry and a specialized antenna, adding cost, increasing weight and size, and consuming the limited battery power resources during operation. In addition, GPS reception, may be unavailable in many locations, e.g., where a line of signal cannot be obtained from the GPS antenna to a set of satellites, e.g., 3 or more satellites, to obtain a solution.

In view of the abovementioned limitations, there is a need for improved methods and apparatus to provide wireless terminal location. Apparatus and methods that provide for a WT to be able to receive, identify, and measure strong signals from a plurality of BS transmitters, e.g., from adjacent cells would be beneficial. Apparatus and methods that are less sensitive to wireless terminal position location in terms of the ability to achieve a position fix would also be beneficial. Apparatus and methods that can take advantage of base station broadcast signaling used for other functions, e.g., synchronization, assignments, attachment decisions, etc., to determine device location would be beneficial since the overhead of transmitting signals specifically to facilitate position determination could be avoided.

SUMMARY OF THE INVENTION

Figure 1:
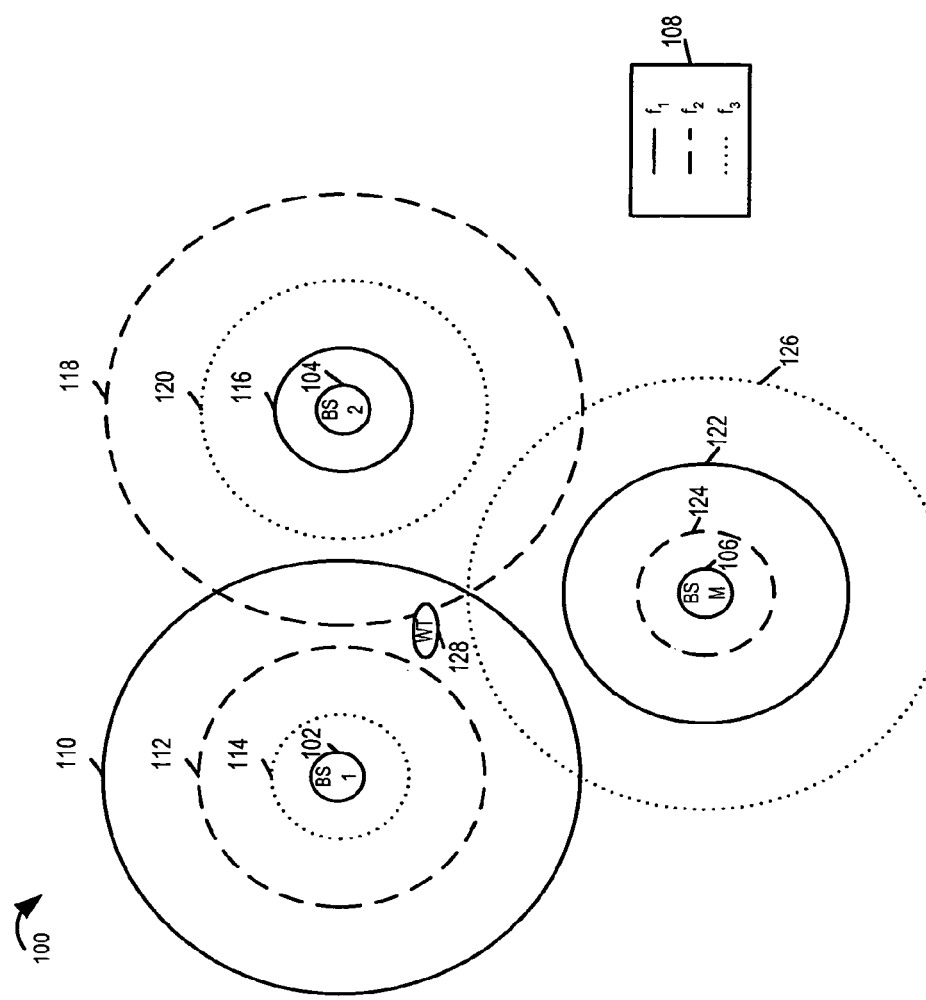
FIG. 1 is a drawing showing three exemplary base stations in a wireless communications system using carrier diversity, the wireless communications system implemented in accordance with the present invention.

An exemplary method of operating a wireless communications device, e.g., a wireless terminal such as a mobile node, to perform a location determination operation based on signals received from different base stations is described.

The location of the wireless terminal can, and sometimes are, determined in accordance with the invention from signals received from two different base stations. However, in some embodiments additional signals are received and used.

In one particular exemplary embodiment used to explain the invention, a wireless communications device to receive first, second and third signals from first, second and third base stations respectively, said first and second signals corresponding to first and second carrier frequencies, respectively, said first and second carrier frequencies being different. The exemplary method further comprises determining at least two channel gain ratios, said at least two channel gain ratios including a first channel gain ratio and a second channel gain ratio, the first channel gain ratio being a ratio of a first channel gain to a second channel gain, the first channel gain being a channel gain between said first base station and said wireless communications device, the second channel gain being a channel gain between said second base station and said wireless communications device. The method further comprises determining a geographic area which corresponds to said at least two determined channel gain ratios.

Other embodiments and implementations are also possible and all the steps described above are not necessarily required in all implementations of the invention.

One exemplary wireless communications device, e.g., a wireless terminal such as a mobile node, implemented in accordance with the present invention, determines its geographic location based upon received signals from three or more base stations using at least two different carrier frequencies. The exemplary wireless communications device comprises, in some but not necessarily all embodiments, a receiver for receiving first, second, and third signals from first, second, and third base stations, respectively, said first and second signals corresponding to first and second carrier frequencies, said first and second carrier frequencies being different. The exemplary wireless terminal may also include a power measurement module for measuring the received power of said first, second and third signals and a relative transmission power determination module for determining relative transmission powers between said first, second, and third signals. The exemplary wireless terminal may further comprise a channel gain ratio module for determining at least two channel gain ratios, said at least two channel gain ratios including a first channel gain ratio and a second channel gain ratio, the first channel gain ratio being a channel gain ratio between a first channel gain and a second channel gain, said first channel gain being a channel gain between said first base station and said wireless communications device, said second channel gain being a channel gain between said second base and said wireless communications device, and a third channel gain being a channel gain between said third base station and said wireless communications device. The exemplary wireless communications device further comprises a geographic area determination module for determining a geographic area corresponding to said at least two determined channel gain ratios.

While various embodiments have been discussed in the summary above, it should be appreciated that not necessarily all embodiments include the same features and some of the features described above are not necessary but can be desirable in some embodiments. Numerous additional features, embodiments and benefits of the present invention are discussed in the detailed description which follows.

DETAILED DESCRIPTION OF THE INVENTION

FIG. 1 is a drawing showing three exemplary base stations, BS 1 102, BS 2 104, BS M 106 in a wireless communications system 100 using carrier diversity. Each BS 102, 104, 106, transmits using a plurality, e.g., three different carrier frequencies, each at a different power level. The power transmission levels for a given carrier for adjacent base stations are different. The power level strength for a given carrier and base station is indicated by the relative size of the corresponding circle around the base station. As shown in legend 108, the solid line is used to represent the $f_1$ carrier frequency; the dashed line is used to represent the $f_2$ carrier frequency; the dotted line is used to represent the $f_3$ carrier frequency. BS1 102 transmits using carrier frequencies ($f_1$, $f_2$, $f_3$) at (high, medium, low) power level represented by circles (110, 112, 114), respectively. BS2 104 transmits using carrier frequencies ($f_1$, $f_2$, $f_3$) at (low, high, medium) power level represented by circles (116, 118, 120), respectively. BSM 106 transmits using carrier frequencies ($f_1$, $f_2$, $f_3$) at (medium, low, high) power level represented by circles (122, 124, 126), respectively. The carrier diversity tends to reduce overall interference levels in the system. The carrier diversity approach advantageously makes available a wide range of signals of different signal strength as a function of location which may be monitored, compared, and evaluated by wireless terminals traversing the system. An exemplary wireless terminal 128, e.g., a mobile node, can move throughout the system, receive, identify, measure, and evaluate broadcast system information from multiple base station transmitters. Using the received broadcast information and stored information, e.g., system topology including bases station locations and interspacing distances, carriers and associated power levels used by each base station, the wireless terminal 128 can evaluate and compare received signals and use triangulation to approximate its location in the system. In some embodiments, the WT 128 can send feedback reports of the received broadcast information to the base station being used as its attachment point in the network. The base station can use this feedback information and detailed system information, e.g., topology such as base station locations, distances between base station, and known obstructions, gain adjustment information, e.g., knowledge of dead spots in the system, and historical collected power level mapping information to estimate a location for the wireless terminal.

Although the example of FIG. 1 shows three power levels (low, medium, high) and three carrier frequencies (f1, f2, f3) used by each of the base station transmitters, in general, different base stations transmitters in the system may use different power levels and different sets of carrier frequencies, the used frequencies and power levels being known to the WTs.

Figure 7:
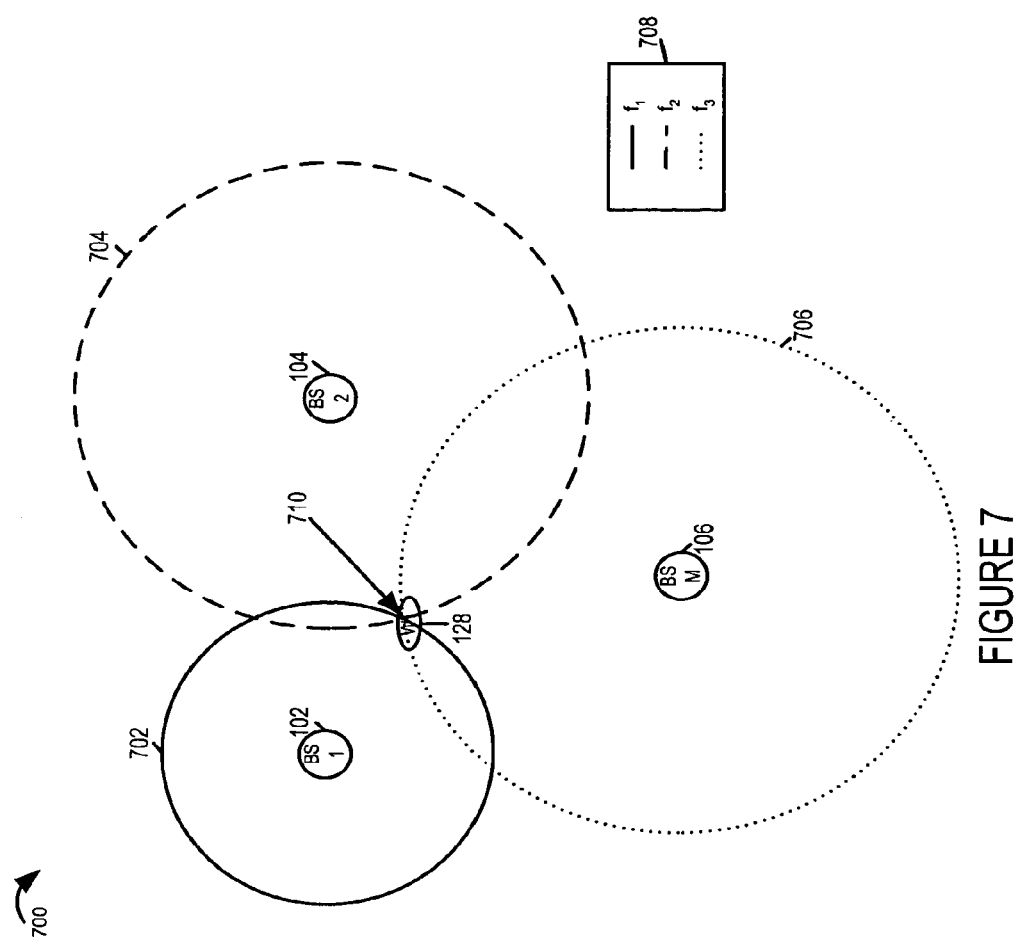
FIG. 7 is a drawing illustrating an exemplary method of performing wireless terminal location that may be used in an exemplary system in accordance with the present invention.

FIG. 7 is a drawing 700 illustrating an exemplary method of performing wireless terminal location that may be used in the exemplary system 100 of FIG. 1. FIG. 7 shows BS 1 102, BS 2 104, BS M 106, and WT 128. Broadcast signaling in the strongest detectable carrier frequency from each cell base station is identified by WT 128, its received power level measured and compared to the known transmit power level, and an distance estimate to the BS is determined. Then a circle is formed around the base station representing potential positions of WT 128 corresponding to the distance estimate. Legend 708 identifies the carrier frequency ($f_1$, $f_2$, $f_3$) used for each base station (BS1, BS 2, BS M) distance estimate by (solid, dashed, dotted line). Solid line circle 702 represents potential positions of WT 128 based on BS 1 signal measurement; dashed line circle 704 represents potential positions of WT 128 based on the BS 2 signal measurement; dotted line circle 706 represents potential positions of WT 128 based on BS M signal measurement. The intersection of the three circles, position 710 represents the estimated position of WT 128.

Figure 8:
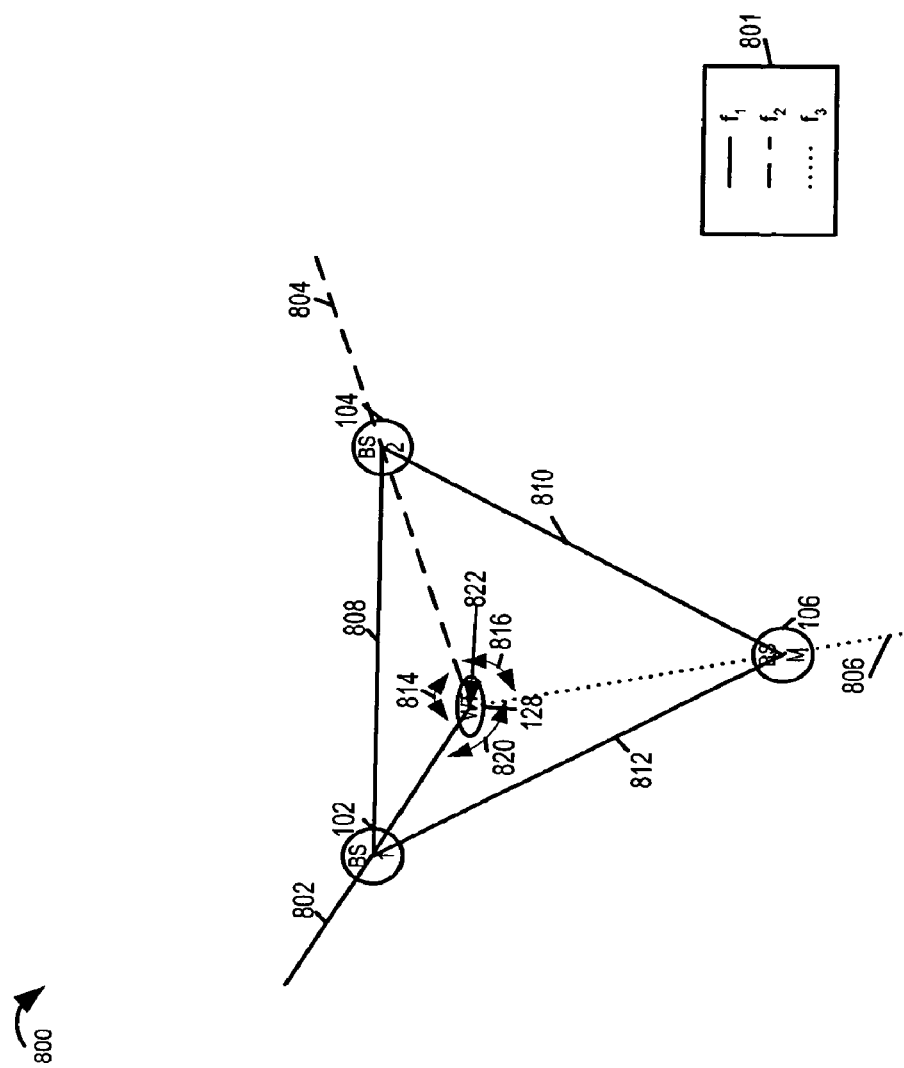
FIG. 8 is a drawing illustrating an exemplary method of performing wireless terminal location that may be used in an exemplary system in accordance with the present invention.
Figure 9:
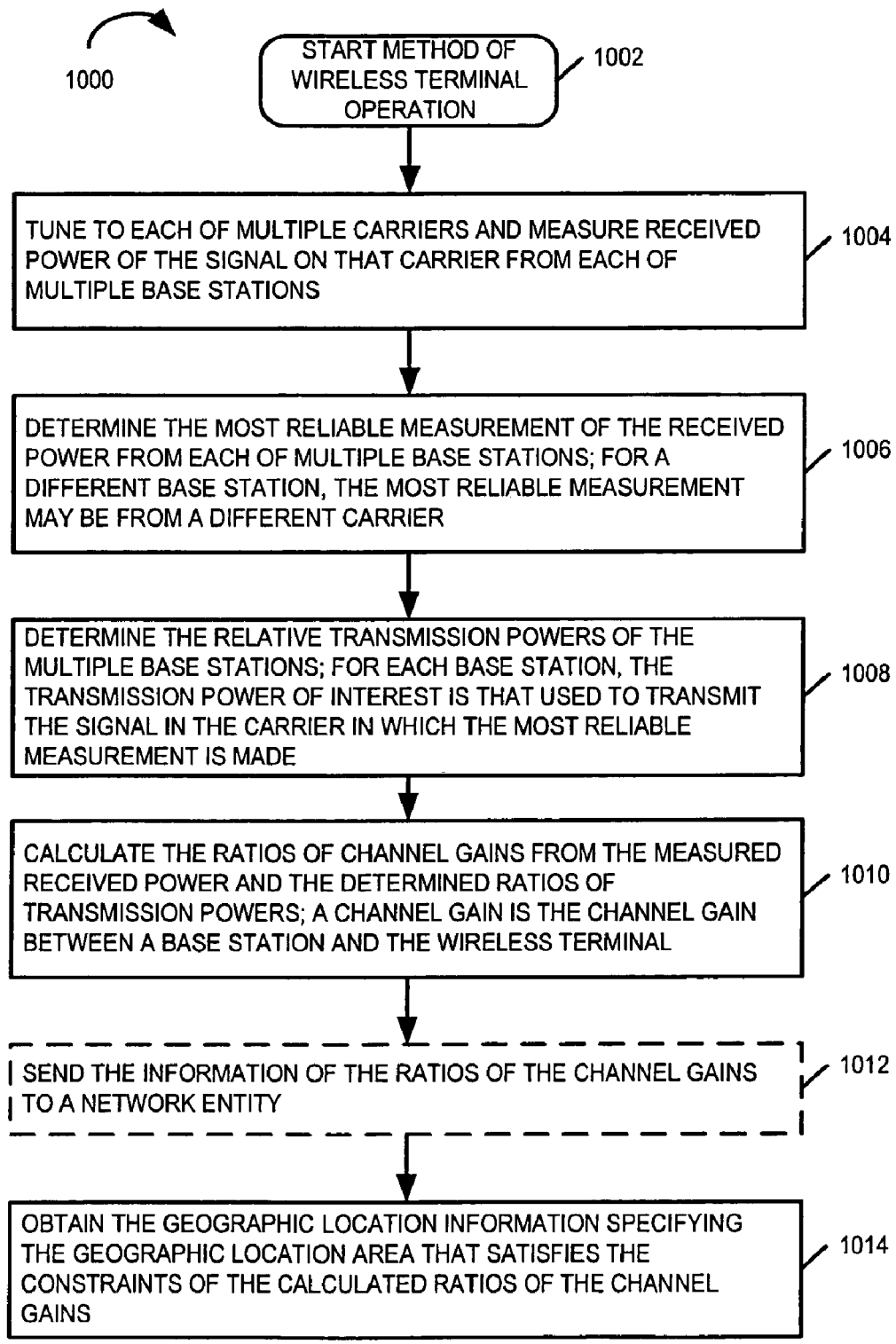
FIG. 9 is a drawing of a flowchart of an exemplary method of operating a wireless terminal in an exemplary wireless communications system in accordance with the present invention.

FIG. 8 is a drawing 800 illustrating an exemplary method of performing wireless terminal location that may be used in the exemplary system 100 of FIG. 1. FIG. 8 shows BS 1 102, BS 2 104, BS M 106, and WT 128. It is assumed that in this embodiment, WT 128 includes a signal direction identification capability. Broadcast signaling in the strongest detectable carrier frequency from each cell base station is identified by WT 128, and the direction or relative direction, with respect to another base station, from which the signal came is determined by WT 128. Legend 801 identifies the carrier frequency ($f_1$, $f_2$, $f_3$) used by WT 128 for each base station (BS1, BS 2, BS M) direction estimate. Determined solid line 802 identifies the direction along which BS 1 102 is expected to be located; determined dashed line 804 identifies the direction along which BS 2 104 is expected to be located. Determined dotted line 806 identifies the direction along which BS M 106 is expected to be located. Determined angle 814 identifies the measured angle between BS1 and BS2; determined angle 816 identifies the measured angle between BS 2 and BS M; determined angle 820 identifies the measured angle between BS 1 and BS M. The locations of BS 1, BS 2, and BS M as well as the distances between BSs (BS 1 to BS 2) 808, (BS 2 to BS M) 810, (BSM to BS 1) 812 are known by WT 128. Using the determined directional lines 802, 804, 806, and/or determined angles 814, 816, 820, in combination with the known geographic information on the BSs, WT 128 can determine its estimated position 822.

Various other embodiments are possible, in accordance with the invention, to determine WT position which take advantage of the carrier diversity employed in the system. Such methods advantageously use the plurality of different transmission power level signals using different carrier frequencies that are available from a plurality of known base station transmitters. For example, at different locations different signals may be selected for reception and evaluation from the diversity of broadcast signals available. Comparisons of detected received and identified signal strength levels between adjacent base stations can be used to determine relative position between two base stations.

Figure 2:
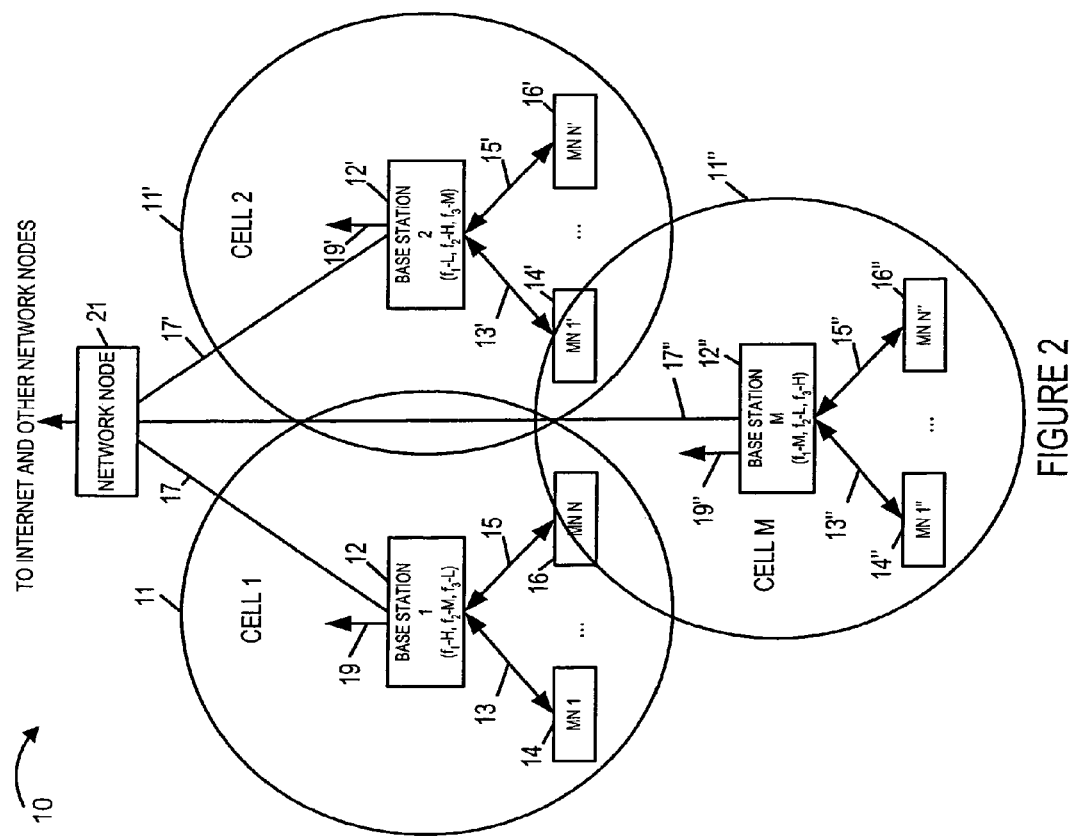
FIG. 2 is a drawing of an exemplary system implemented in accordance with the present invention and using methods of the present.

FIG. 2 is a drawing of an exemplary system 10 implemented in accordance with the present invention and using methods of the present. System 10 includes a plurality of base stations (BS1 12, BS2 12', BSM 12"). Each base station (12, 12', 12") transmits downlink signaling on a plurality of carrier frequencies. BS1 12 uses carrier frequencies ($f_1$, $f_2$, $f_3$) at power levels (high, medium, low), respectively. BS2 12' uses carrier frequencies ($f_1$, $f_2$, $f_3$) at power levels (low, high, medium), respectively. BSM 12" uses carrier frequencies ($f_1$, $f_2$, $f_3$) at power levels (medium, low, high), respectively. Each base station (12, 12', 12") corresponds to a cell (cell 1 11, cell 2 11', cell M 11"), respectively, representing a wireless coverage area. Although each cell (11, 11', 11") is illustrated a single circle for simplicity of illustration, it is to be understood that the different carrier powers used by each base station actually resulting in different size coverage areas for each carrier and different amounts of overlap between adjacent cells for different carriers.

Each BS (12, 12', 12") is coupled to a network node 21, e.g., a router, via network links (17, 17', 17"), respectively. The network node 21 is coupled to the Internet and other network nodes. Wireless terminals, e.g., mobile nodes may move throughout the system 10 and couple to a BS as a point of network attachment. Mobile node 1 (MN 1) 14 and MN N 16 are coupled to BS 1 12 via wireless links 13, 15, respectively. MN 1' 14' and MN N' 16' are coupled to BS 2 12' via wireless links 13', 15', respectively. MN 1" 14" and MN N" 16" are coupled to BS M 12" via wireless links 13", 15", respectively.

Each BS (12, 12', 12") also transmits, e.g., periodically, various broadcast signals, e.g., beacon signals, pilot signal, assignment signals, etc. on each of its carrier frequencies. MNs, e.g., MN N 16 may receive these broadcast signals from its BS point of attachment and from other BSs, e.g., adjacent cell transmitters. The plurality of carrier frequencies used and the differences in power levels used increases the likelihood that a MN, at any given point in the system shall be able to receive and evaluate several different broadcast signals, e.g., from different transmitters. Based on the evaluation of the received signals and knowledge of the system, the MN can use triangulation to determine its estimated position. Alternatively, or in addition, the MN can communicate received broadcast information back to a BS which can make the MN location determination.

Figure 3:
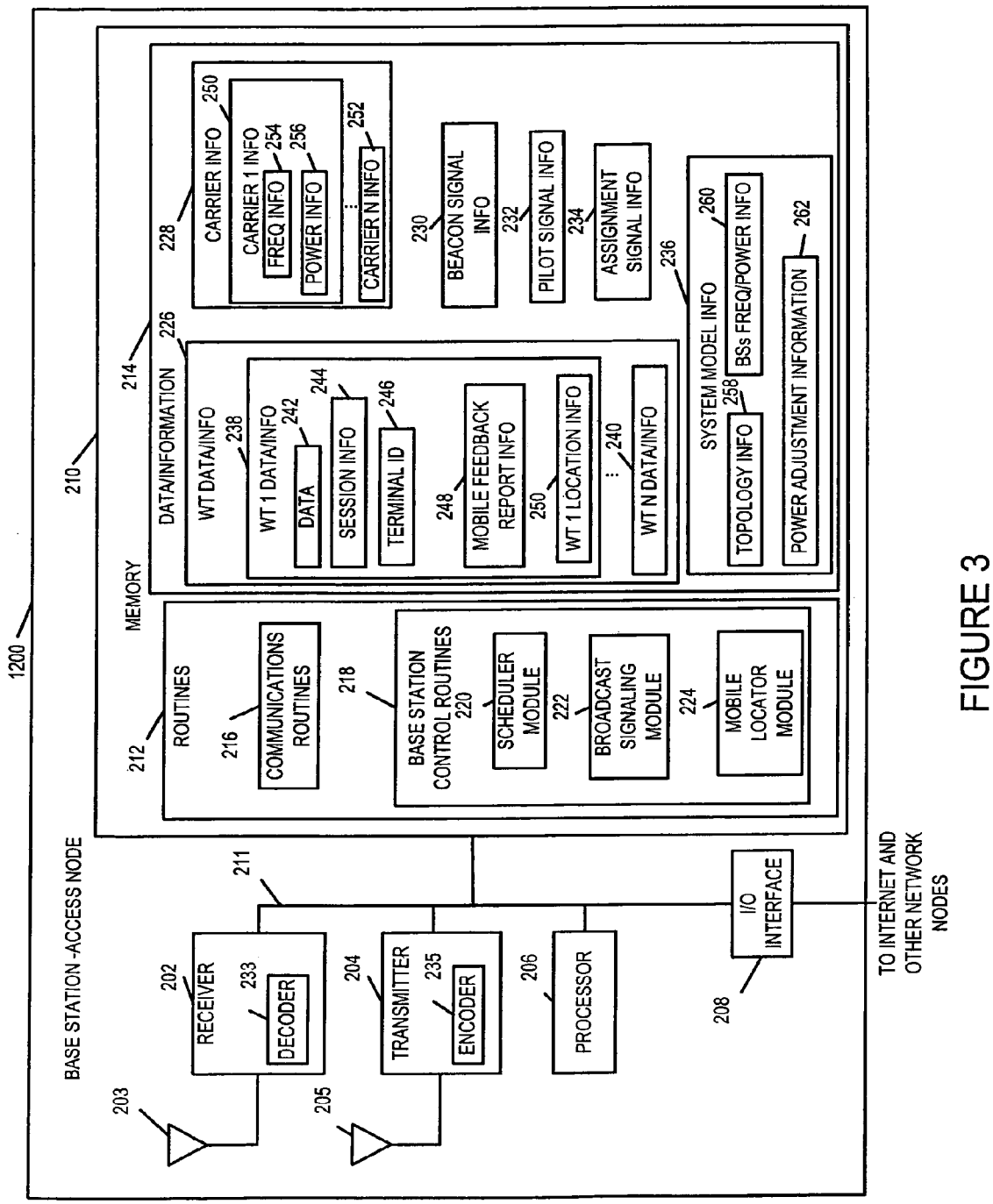
FIG. 3 is a drawing of an exemplary base station (access node) implemented in accordance with the present invention and using methods of the present invention.

FIG. 3 is a drawing of an exemplary base station (access node) 1200 implemented in accordance with the present invention and using methods of the present invention. The exemplary BS 1200 may be any of the BS 102, 104, 106, 12, 12', 12" of the systems of FIG. 1 or FIG. 2. Exemplary BS 1200 includes a receiver 202, a transmitter 204, a processor 206, an I/O interface 208, and a memory 210 coupled together via bus 211 over which the various elements may interchange data and information. Memory 210 includes routines 212 and data information 214.

The receiver 202 is coupled to receiver antenna 203 and includes a decoder 233 for decoding received uplink signals received from MNs 1400 (See FIG. 4), e.g., including mobile feedback report information. The transmitter 204 is coupled to transmit antenna 205 and includes an encoder 235 for encoding downlink data and information to be transmitted as signals over antenna 205 to MNs 1400. Downlink signals include downlink broadcast signals, e.g., beacon signals, pilots signals, assignment signals, etc., communicated for each of the various carriers used by the BS. Different carriers may use different power levels.

Processor 206, e.g., a CPU, executes the routines 212 and uses the data/information 214 in memory 210 to control the operation of the base station 1200 and implement the methods of the present invention. I/O interface 208 couples the BS 1200 to other network nodes and the Internet.

Routines 212 include communications routines 216 and base station control routines 218. Communications routines 216 are used for controlling the base station 1200 to perform various communications operations and implement various communications protocols. Base station control routines 218 are used to control the base station 1200 operation and implement the steps of the method of the present invention. Base station control routines 218 include a scheduler module 220, a broadcast signaling module 222, and a mobile locator module 224. Scheduler module 220 schedules users, e.g. MNs, for uplink and downlink air link resources, e.g., traffic channel segments, on a plurality of carrier frequencies using a plurality of power levels. Broadcast signaling module 222 uses the data/information 214 to control the generation and transmission of various broadcast signals, e.g., beacon signals, pilot signals, assignment signals, etc., on the various carrier frequencies used by the BS 1200 at the different predetermined power levels used. Mobile node locator module 224 uses the data/information 214 including received mobile feedback report information 248 and system model information 236 to determine a MN's position in the system.

Data/information 214 includes wireless terminal data/information 226, carrier information 228, beacon signal information 230, pilot signal information 232, assignment signal information 234, and system model information 236. WT data/information 226 includes a plurality of sets of WT information, WT 1 data/info 238, WT N data/information 240. WT 1 data/info 238 includes data 242, session information 244, terminal ID 246, mobile feedback report information 248, and WT 1 location information 250. Data 242 includes user data to/from a peer node of WT 1 in which WT 1 is involved in a communications session. Session information 244 includes information pertaining to communications sessions in which WT 1 is participating, e.g., routing information corresponding to a peer node. Terminal identification (ID) 246 is a base station 1200 assigned ID for WT1, e.g., a temporary active user ID. Mobile feedback report information 248 includes feedback information received from a WT including information corresponding to a plurality of downlink broadcast signals received from a plurality of base station transmitters, e.g., using different carrier frequencies and different transmission power levels. WT 1 location information 250 includes an estimated location of WT 1 determined from WT 1 and fed back to the BS 1200 and/or determined by the BS 1200 by mobile locator module 224. WT 1 location information 250 may also include information indicative of the quality and/or uncertainty of the estimated location.

Carrier information 228 includes a plurality of sets of carrier frequency information, carrier 1 information 250, carrier N information 252, each set corresponding to a carrier used by BS 1200. Carrier 1 information 250 includes frequency information 254, e.g., the carrier frequency, associated bandwidth, number of tones, etc., and power information 256, e.g., average power level used for downlink transmissions in the carrier band, specific power levels used for each type of broadcast signal transmitted in the carrier band. Beacon signal information 230 includes information defining tones, timing, duration, and power levels used for transmitting beacon signals for each carrier band. Pilot signal information 232 includes information defining tones, timing, and power levels used for transmitting pilot signals in each carrier band. Assignment signal information 234 includes information defining tones, timing, and power levels used for transmitting assignment signals in each carrier band.

System model information 236 includes topology information 258, base stations' frequency/power information 260, and power adjustment information 262. Topology information 258 includes information identifying the geographic position of various base stations in the system, e.g., those in the vicinity of BS 1200, the distances between the base stations, obstructions between the base stations, etc. BSs frequency/power level information 260 includes information sets for each of the BSs included in the topology info 258 providing carrier frequencies used and broadcast signal transmission power levels used by those BSs. Power adjustment information 262 includes detailed known information of the system, e.g., dead zone areas, high interference areas, etc. Power adjustment information 262 also includes information regarding observed or reported changes or deviations of BS transmission power levels from the values stored in BSs frequency/power info 260. Power adjustment information 262 may also include historical geographic coordinate mapping information of received broadcast power levels. Power adjustment information 262 allows mobile locator routine 224 to adjust or supplement triangulation fixes obtained on a WT from a set of received broadcast signals to more accurately reflect, e.g., correct for deviations in the system.

Figure 4:
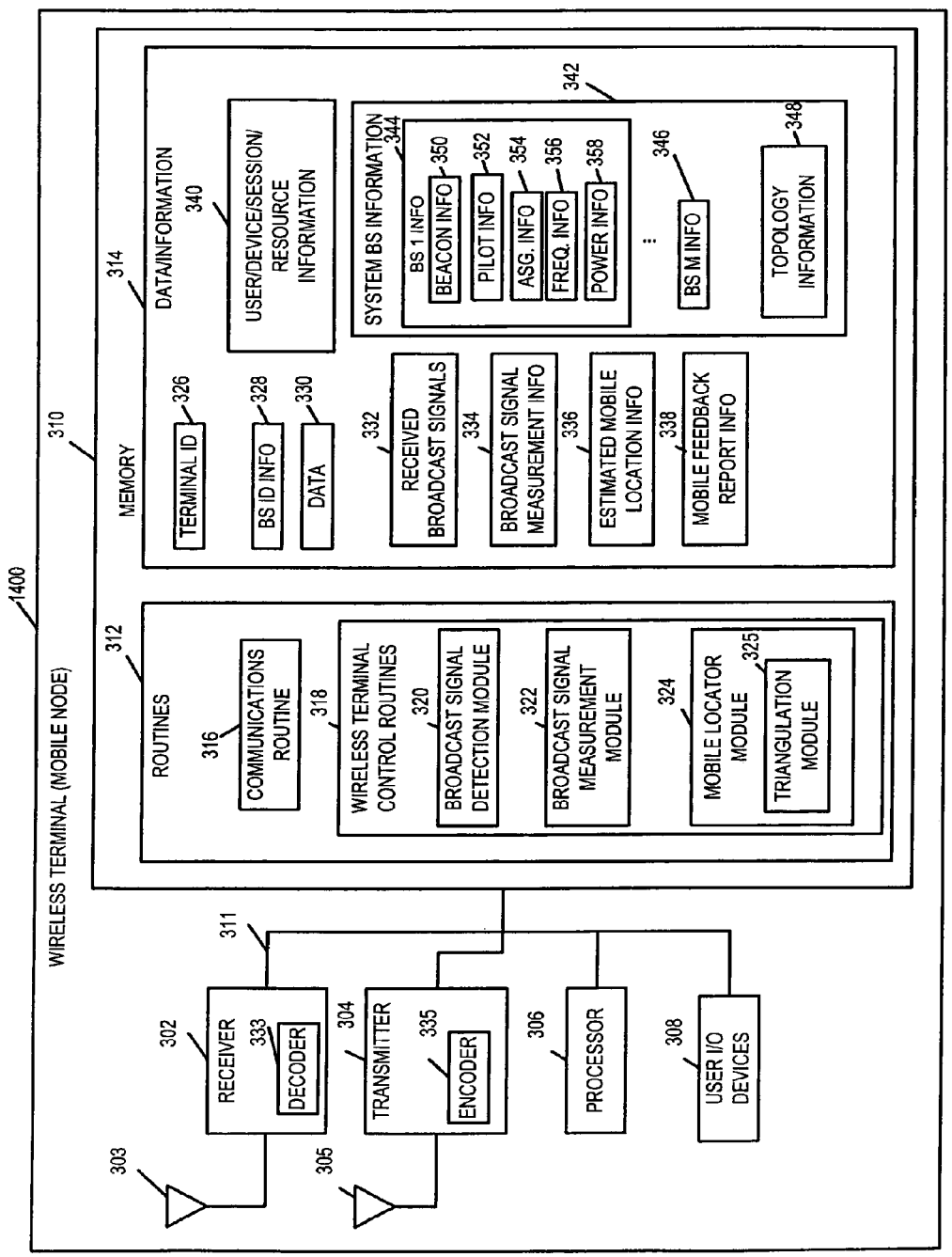
FIG. 4 illustrates an exemplary wireless terminal, e.g., mobile node, implemented in accordance with the present invention.

FIG. 4 illustrates an exemplary wireless terminal 1400, e.g., mobile node, implemented in accordance with the present invention. The mobile node 1400 may be used as a mobile terminal (MT). Exemplary WT 1400 may be any of WTs 128 of FIG. 1 or MNs 14, 14', 14", 16, 16', 16" of FIG. 2. Exemplary WT 1400 includes a receiver 302, a transmitter 304, a processor 306, user I/O devices 308, and memory 310, coupled together via bus 311 over which the various elements may interchange data and information. The mobile node 1400 includes receiver and transmitter antennas 303, 305 which are coupled to receiver and transmitter 302, 304 respectively. The receiver 302 includes a decoder 333 while the transmitter circuitry 304 includes an encoder 335. The receiver 302 receives downlink signals from BSs 1200 including broadcast signals such as, e.g., beacons, pilot signals, and assignment signals transmitted on different carriers at different transmission power levels. Processor 306, e.g., a CPU, executes routines 312 and uses the data/information 314 in memory 310 to control the operation of the WT 1400 and implement the steps of the present invention. User I/O devices 308 include keypads, speakers, microphones, displays, etc. which allow a user to input and output data and information including displaying estimated WT location.

Memory 310 includes routines 312 and data/information 314. The routines 312 include a communications routine 316 and wireless terminal control routines 318. Communications routines 316 are used for controlling the wireless terminal 1400 to perform various communications operations and implement various communications protocols. Wireless terminal control routines 318 are used to control the wireless terminal operation, e.g., operation of I/O devices 308, receiver 302, transmitter 304, and implement the steps of the method of the present. The wireless terminal control routines 318 include a broadcast signal detection module 320, a broadcast signal measurement module 322, and a mobile locator module 324. The broadcast signal detection module 320 identifies received broadcast signals associating each received signal with a corresponding base station transmitter. The broadcast signal measurement module 322 measures identified received broadcast signals, e.g., obtaining a received power level measurement value. The mobile locator module 324 uses the data/information 314 including BS system information 342, and broadcast signal measurement information 334 to determine estimated mobile location information 336, e.g., an estimated location and corresponding uncertainty information of the estimate. The mobile locator module 324 includes a triangulation module 325 which uses measured signal strength information from a plurality of base station transmitters of know location and known transmission power level, to obtain a fix of the WT location. In some embodiments, even where a fix can not be obtained, e.g., due to a limited set of received broadcast signals, the mobile locator module may be able to obtain range information, e.g., with respect to a base station. In some embodiments, the mobile locator module 324, may filter information, and be able to gradually converge on a position fix, even if there are periods of time where no or limited broadcast signaling is received.

Data/information 314 includes a terminal ID 326, BS ID information 328, data 330, received broadcast signals 332, broadcast signal measurement information 334, estimated mobile location information 336, mobile feedback report information 338, user device/session/resource information 340, and system base station information 342. Terminal ID 326 is a BS assigned identifier. Base station ID information 328 includes information identifying the base station 1200 being used by the WT 1400 as its attachment point in the network. Data 330 includes user data, e.g., data to/from a peer node of WT 1400 in a communications session with WT 1400. Received broadcast signals 332 includes received beacon signals, pilot signals, assignments signals, etc., from a plurality of base station transmitters using a plurality of known carrier frequencies at a plurality of known transmission power levels and identification information associating each of the received signals with a specific base station transmitter. Broadcast signal measurement information 334 includes power level measurement information for received and identified broadcast signals. Estimated mobile location information 336 includes an estimated wireless terminal 1400 location and associated expected uncertainty and/or quality factor associated with the position estimate. Mobile feedback report information 338 may include measurement information corresponding to received and identified broadcast signals, which may be used subsequently by BS 1200 to determine a position fix of WT 1400. In some embodiments mobile feedback report information 338 include WT estimate mobile location information 336.

User/device/session/resource information 340 includes information pertaining to communication sessions, e.g., with peer nodes of WT 1400. Information 340 may include routing information and resource requirement information, e.g., number of uplink traffic segments requests, pertaining to each session.

System base station information 342 includes a plurality of sets of BS information, BS 1 information 344, BS M information 346, and topology information 348. The system base station information 342 includes characteristic information and is used when evaluating the received broadcast signals to achieve identification and determine power level in relation to transmission power level for the signals. BS 1 information 344 includes beacon information 350, pilot information 352, assignment information 354, frequency information 356, and power information 358. Beacon information 350 includes identifying information such as tone, timing, duration, frequency, and power level of transmission for each of beacons used by each of the carrier frequencies used by the BS1. Pilot information 352 includes identifying information such as tone, timing, frequency, and power level of transmission for each pilot signal used by each of the carrier frequencies used by the BS1. Assignment information 354 includes identifying information such as tone, timing, frequency, and power level of transmission for each of assignment signals used by each of the carrier frequencies used by the BS1. Frequency information 356 includes information defining the carrier frequencies and associated bandwidths for each carrier used by BS 1. Power information 358 includes information associating each carrier used with transmission power levels. Topology information 348 includes position information for each of the base stations in the system and distance information between the various base stations.

Figure 5:
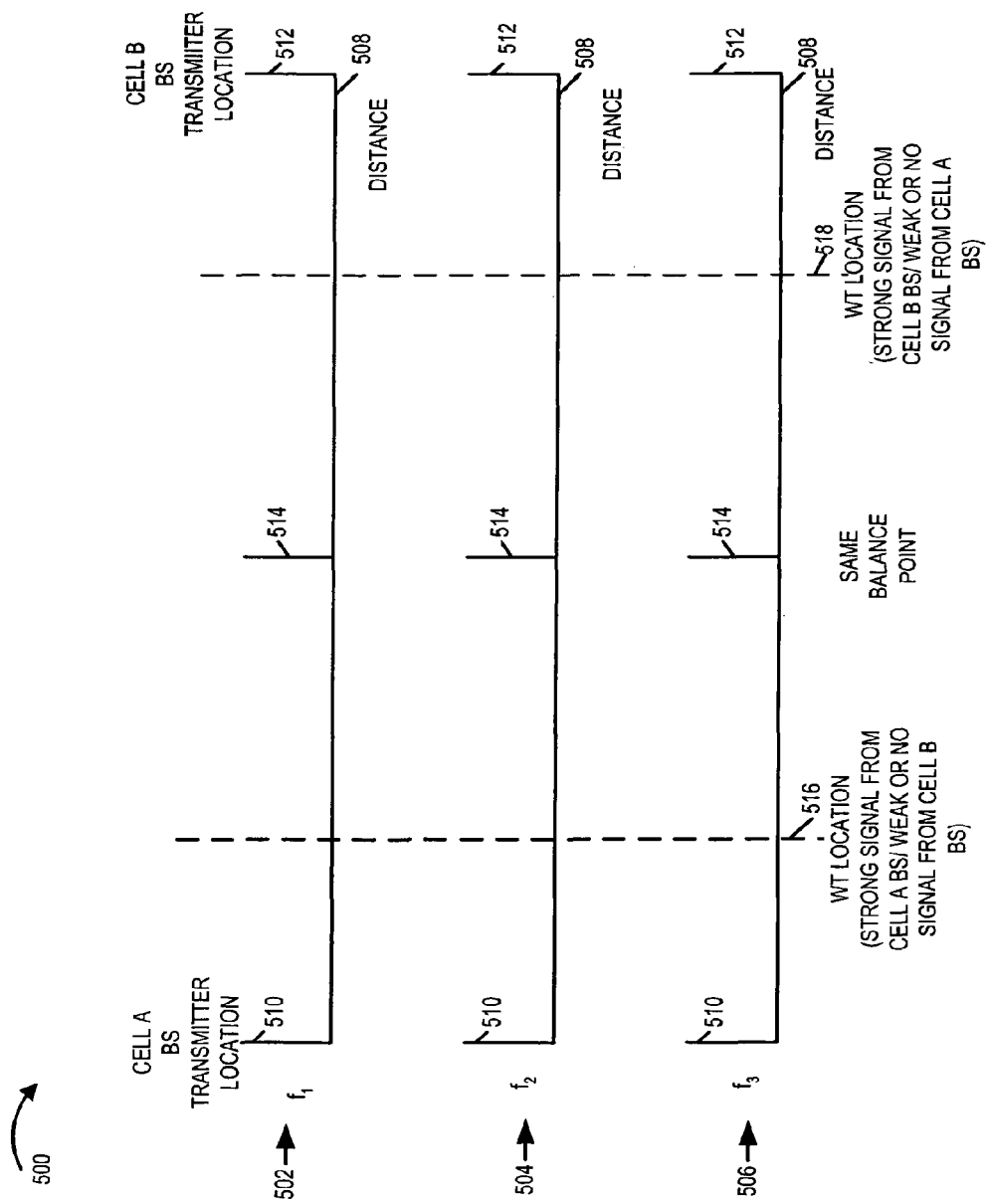
FIG. 5 is a drawing used for illustrating two exemplary cells, Cell A and Cell B, each using 3 carrier frequencies $f_1, f_2, f_3$.

FIG. 5 is a drawing 500 used for illustrating two exemplary cells, Cell A and Cell B, each using 3 carrier frequencies $f_1$, $f_2$, $f_3$. (Top, middle, lower) drawings (502, 504, 506) are used to represent distance 508 between BS cell A transmitter location 510 and BS cell B BS transmitter location 512 for carrier frequency ($f_1$, $f_2$, $f_3$), respectively. If each cell transmits each carrier frequency at the same power level, the balance point will be the same in the system for each carrier, e.g., a center point 514 between the two base station transmitters. In addition, such a system is generally configured to reduce interference as a WT is situated away from the boundary. Therefore, closer to a cell, the WT will receive a strong signal from one BS and a weak or no signal from an adjacent cell. For example, consider an exemplary location 516, near cell A transmitter; a WT at this point will receive a strong signal from cell A BS transmitter and a weak or no signal from cell B BS transmitter. Consider another exemplary location 518, near cell B transmitter; a WT at this point will receive a strong signal from cell B BS transmitter and a weak or no signal from cell A BS transmitter. Near the balance point 514, low received signal strength and interference between the two cells may limit detection and identification. This approach does not lend itself well to position location based on signal strength measurements from multiple base station transmitters.

Figure 6:
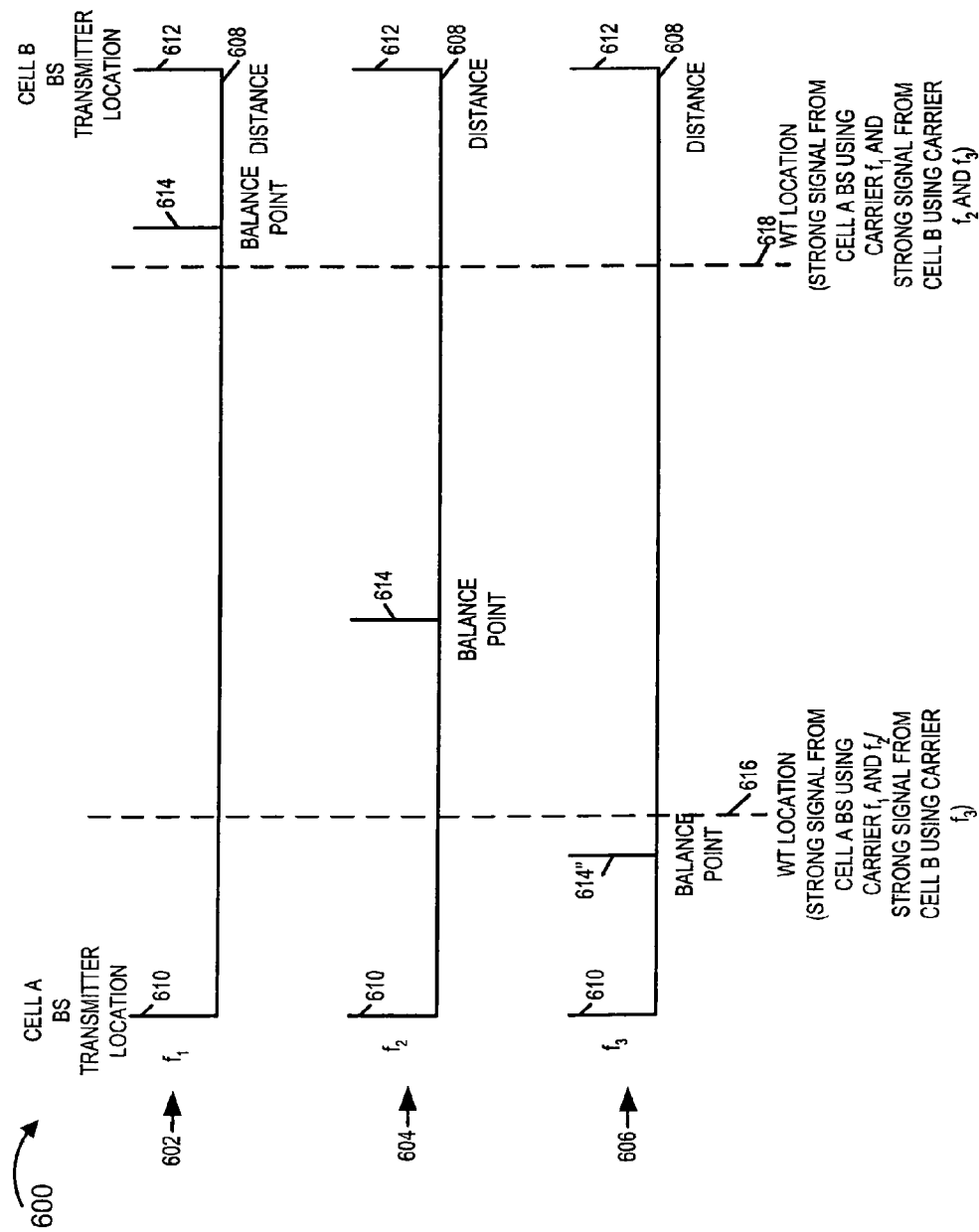
FIG. 6 is a drawing used for illustrating two exemplary cells, Cell A and Cell B, each using 3 carrier frequencies $f_1, f_2, f_3$ being transmitted at different power levels from each cell transmitter.

FIG. 6 is a drawing 600 used for illustrating two exemplary cells, Cell A and Cell B, each using 3 carrier frequencies $f_1$, $f_2$, $f_3$ being transmitted at different power levels from each cell transmitter. The same carrier frequency being transmitted at different power levels for different cells. (Top, middle, lower) drawings (602, 604, 606) are used to represent distance 608 between BS cell A transmitter location 610 and BS cell B BS transmitter location 612 for carrier frequency ($f_1$, $f_2$, $f_3$), respectively. The balance point will be different in the system for each carrier, e.g., a different point between the two carriers for each frequency where observed received powers balance. Balance points for power levels received signals from using carrier ($f_1$, $f_2$, $f_3$) are represented as points (614, 614', 614"), respectively. Therefore, at different locations between the cells, different relationships will exist in terms of power levels between the two base stations providing more opportunity to obtain received broadcast signals from more than one cell. For example, at exemplary location 616, a WT will receive a strong signal from cell A BS using carrier frequency $f_1$ and $f_2$ and a strong signal from cell B BS using carrier frequency $f_3$. AT exemplary location 618, the WT will receive a strong signal from cell A BS using carrier frequency $f_1$ and a strong signal from cell B using carrier frequency $f_2$ and $f_3$. This approach of carrier diversity using different power levels lends itself well to position location based on signal strength measurements from multiple base station transmitters.

Figure 10:
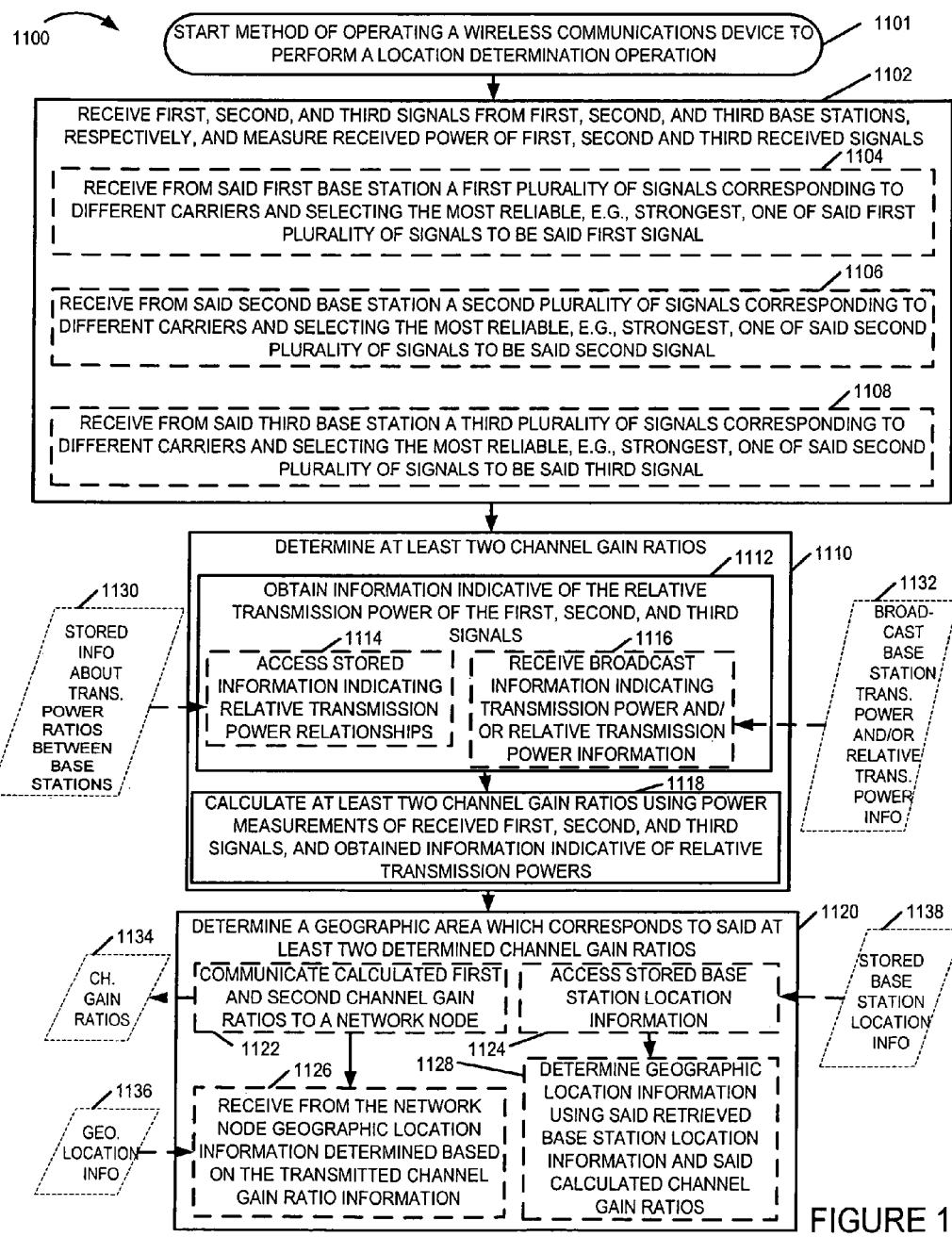
FIG. 10 is a drawing of a flowchart of an exemplary method of operating a wireless communications device to perform a location determination operation in accordance with the present invention.

FIG. 10 is a drawing of a flowchart 1000 of an exemplary method of operating a wireless terminal in an exemplary wireless communications system in accordance with the present invention. The exemplary method starts in step 1002, where the wireless terminal is powered on and initialized. Operation proceeds from start step 1002 to step 1004. In step 1004, the wireless terminal is operated to tune to each of multiple carriers. With each carrier, the wireless terminal measures the received power of the signal on that carrier from each of multiple base stations that the wireless terminal can detect. For example, suppose that there are two carriers, A and B and that the wireless terminal is surrounded by three base stations, 1, 2, and 3. The wireless terminal first tunes to carrier A, and measures the received power of the signal on carrier A from base stations 1, 2, and 3, which are denoted as $P_{A,1}$, $P_{A,2}$, $P_{A,3}$. The wireless terminal then tunes to carrier B, and measures the received power of the signal on carrier B from base stations 1, 2, and 3, which are denoted as $P_{B,1}$, $P_{B,2}$, $P_{B,3}$.

Operation proceeds from step 1004 to step 1006. The wireless terminal determines the most reliable measurement of the received power from each of the multiple base stations. For a different base station, the most reliable measurement may be from a different carrier. Continuing with the above example, suppose that the signal on carrier A from base station 1 is more reliable than the signal on carrier B from the same base station 1. So the most reliable measurement of the received signal from base station 1 is on carrier A: $P_{A,1}$. Similarly, suppose that the signal on carrier B from base station 2 is more reliable than the signal on carrier A from the same base station 2. So the most reliable measurement of the received signal from base station 2 is on carrier B: $P_{B,2}$. Suppose that the signal on carrier B from base station 3 is more reliable than the signal on carrier A from the same base station 3. So the most reliable measurement of the received signal from base station 3 is on carrier B: $P_{B,3}$.

In step 1008, the wireless terminal determines the relative transmission powers of the multiple base stations. The relative transmission power is relative to a common power, which can be a known number or the transmission power of a base station in the system. For each base station, the transmission power of interest is that used to transmit the signal in the carrier in which the most reliable measurement is made. In the above example, the wireless terminal is to determine the relative powers of base station 1 on carrier A, of base station 2 on carrier B, and of base station 3 on carrier B. In one embodiment, the wireless terminal may get the information on the relative transmission powers from some pre-stored knowledge. For example, base stations 1 and 2 may be of a first type in which the transmission power on carrier A is 6 dB higher than that on carrier B, while base station 3 may be of a second type in which the transmission power on carrier B is 6 dB higher than that on carrier A. Then with that apriori information, the wireless terminal can determine the relative transmission powers. In another embodiment, each base station may broadcast its transmission power information in each carrier, and therefore the wireless terminal can obtain the relative power information from that broadcast message.

In step 1010, the wireless terminal calculates the ratios of channel gains from the measured received power and the determined ratios of transmission powers; a channel gain is the channel gain between a base station and the wireless terminal. Denote $G_1$ the channel gain from base station 1 to the wireless terminal, $G_2$ the channel gain from base station 2 to the wireless terminal, $G_3$ the channel gain from base station 3 to the wireless terminal. Continue the above example. Denote that the relative transmission power on the carrier of interest is $T_{A,1}$ in base station 1, $T_{B,2}$ in base station 2, and $T_{B,3}$ in base station 3. Then the ratio of channel gains $G_1/G_2$ is calculated by $(T_{A,1}/P_{A,1})/(T_{B,2}/P_{B,2})$, and the ratio of channel gains $G_2/G_3$ is calculated by $(T_{B,2}/P_{B,2})/(T_{B,3}/P_{B,3})$.

In step 1012, the wireless terminal sends the information of the ratios of the channel gains to a network entity, which has access to a database containing the geographic location information of the multiple base stations. The network entity uses the reported ratios of the channel gains to determine the geographic location information specifying the geographic location area that satisfies the constraints of the calculated ratios of the channel gains, e.g., according to the wireless signal power propagation model. In step 1014, the wireless terminal obtains from the network entity that geographic location information.

Step 1012 can be skipped if the wireless terminal itself has the geographic location information. For example, the geographic location information may be pre-stored in the wireless terminal's memory, or be broadcast in the signal, which is to be received by the wireless terminal. In that case, the wireless terminal uses the calculated ratios of the channel gains to determine the geographic location information specifying the geographic location area that satisfies the constraints of the calculated ratios of the channel gains, e.g., according to the wireless signal power propagation model.

FIG. 10 is a drawing of a flowchart 1100 of an exemplary method of operating a wireless communications device to perform a location determination operation in accordance with the present invention. For example, the wireless communications device may be a wireless terminal, e.g., a mobile node, in an exemplary OFDM multiple access spread spectrum wireless communications system, implemented in accordance with the present invention. The exemplary method starts in step 1101, where the wireless communications device is powered on and initialized. Operation proceeds from start step 1101 to step 1102. In step 1102, the wireless communications device is operated to receive first, second, and third signals from first, second, and third base stations, respectively, and to measure the received power of the first, second, and third received signals. In some embodiments, at least two of said first, second, and third signals correspond to different carrier frequencies. In some embodiments, at least some of said first, second, and third base stations support multiple carrier frequencies for downlink signaling. In some such embodiments, at least one of sub-step 1104, 1106, and 1108 are performed.

In sub-step 1104, the wireless communications device is operated to receive a first plurality of signals corresponding to different carriers from the first base station and to select the most reliable, e.g., strongest, one of said first plurality of signals to be the first signal. In sub-step 1106, the wireless communications device is operated to receive a second plurality of signals corresponding to different carriers from the second base station and to select the most reliable, e.g., strongest, one of said second plurality of signals to be the second signal. In sub-step 1108, the wireless communications device is operated to receive a third plurality of signals corresponding to different carriers from the third base station and to select the most reliable, e.g., strongest, one of said third plurality of signals to be the third signal.

Operation proceeds from step 1102 to step 1110. In step 1110, the wireless communications device is operated to determine at least two channel gain ratios. The at least two channel gain ratios include a first channel gain ratio and a second channel gain ratio. The first channel gain ratio is a ratio of a first channel gain to a second channel gain. The first channel gain is a channel gain between the first base station and the wireless communications device; the second channel gain is a channel gain between the second base station and the wireless communications device. A third channel gain is a channel gain between the third base station and the wireless communications device. Step 1110 includes sub-step 1112 and sub-step 1118. In sub-step 1112, the wireless communications device is operated to obtain information indicative of the relative transmission power of the first, second, and third signals. Sub-step 1112 illustrates two exemplary alternative implementations, sub-step 1114 and sub-step 1116.

In sub-step 1114, the wireless communications device accesses stored information 1130 indicating relative transmission power relationships. For example, in some embodiments, the relative transmission power levels between the different base stations are predetermined and such predetermined power relationship information is stored in the wireless communications device. In some embodiments, different carriers for the same base station have different relative power levels, e.g., different fixed predetermined power levels.

Alternatively, in sub-step 1116, the wireless communications device receives broadcast information 1132 indicating transmission power and/or relative transmission power information. In some embodiments, the wireless communications device receives broadcast information about the transmission power level used by the first base station, broadcast information about the transmission power level used by the second base station, and broadcast information about the transmission power used by the third base station. In some such embodiments, the broadcast information about the first, second, and third transmission power levels is transmitted by a single one of the first, second, and third base stations. In some embodiments, each base stations transmits power information about the transmission power level which it is using. In various embodiments, the transmitted power level information is the transmitted signal power. In some embodiments, the transmitted power level information is a relative power level which is relative to the transmission power level used by another base station. In some embodiments, the transmitted power level information is a relative power level with respect to a reference value known to the wireless communications device.

Operation proceeds from sub-step 1112 to sub-step 1118. In sub-step 1118, the wireless communications device is operated to calculate at least two channel gain ratios using received power measurements of first, second, and third signals, and obtained information indicative of the relative transmission powers.

Operation proceeds from step 1110 to step 1120. In step 1120, the wireless terminal is operated to determine a geographic area which corresponds to said at least two determined channel gain ratios. Step 1120 illustrates two alternative exemplary implementations: (i) sub-step 1122 and sub-step 1126, and (ii) sub-steps 1124 and sub-step 1128. In sub-step 1122, the wireless communications device is operated to communicate calculated first and second channel gain ratios 1134 to a network node. Then, in step 1126, the wireless communications device receives from the network node geographic location information 1136, e.g., a geographic position fix of the wireless communications device and associated uncertainty information, based on the channel gain ratio information. Alternatively, in sub-step 1124, the wireless communications device is operated to access stored base station location information 1138. Then, in sub-step 1128, the wireless communications device is operated to determine the geographic location information, e.g., a geographic position fix of the wireless communications device and associated uncertainty information, using the retrieved base station location information and the calculated channel gain ratios.

Figure 11:
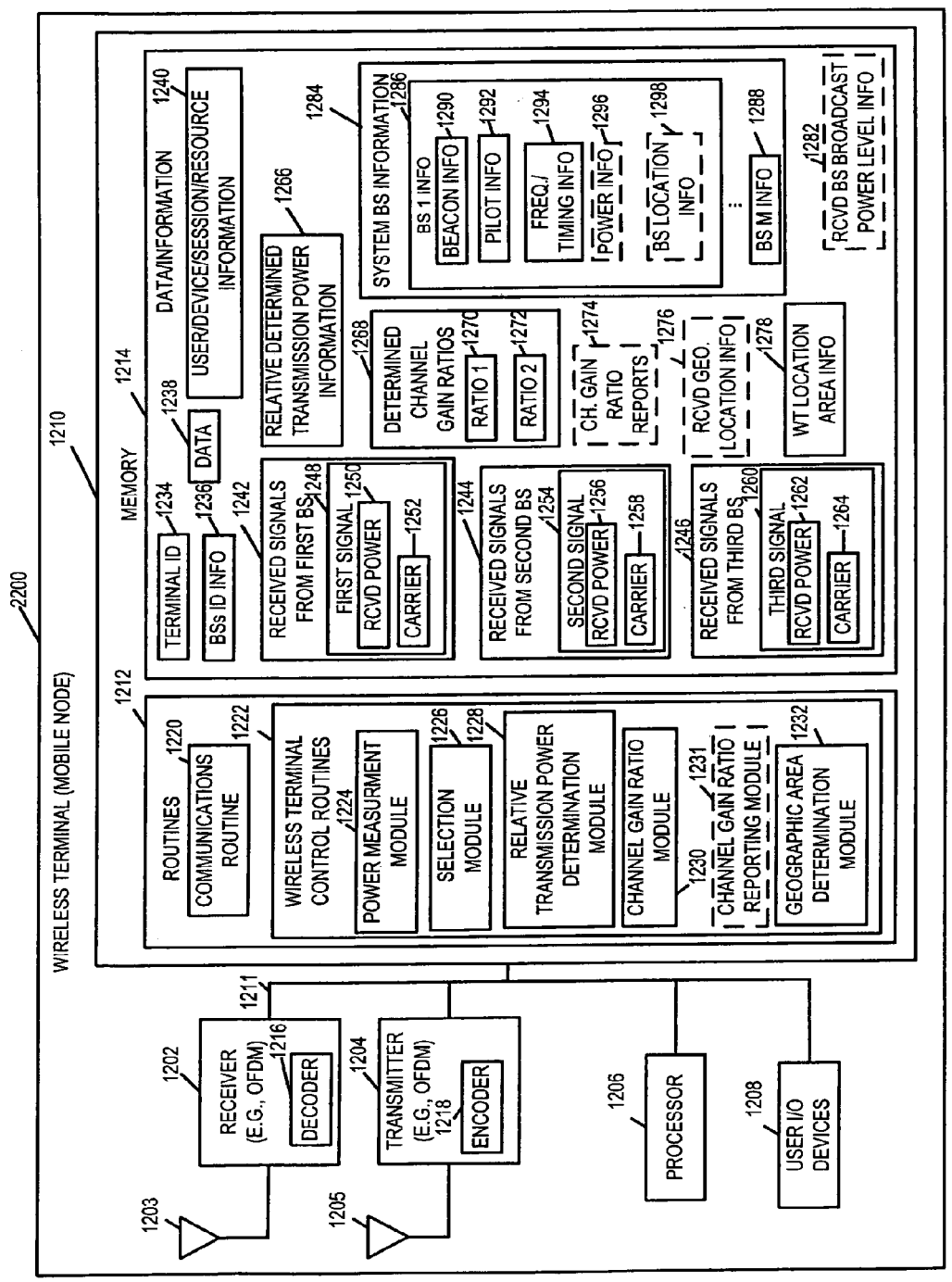
FIG. 11 is a drawing of an exemplary wireless terminal, e.g., mobile node, implemented in accordance with the present invention.

FIG. 11 is a drawing of an exemplary wireless terminal 2200, e.g., mobile node implemented in accordance with the present invention. Exemplary wireless terminal 2200, is, e.g., an exemplary wireless terminal in a spread spectrum multiple access orthogonal frequency division multiplexing (OFDM) wireless communications system including a plurality of base stations. Exemplary wireless terminal 2200 includes a geographic locating capability, e.g., WT 2200 determines its geographic location area based upon received signals from three or more base stations using at least two different carrier frequencies. Wireless terminal 2200 includes an OFDM receiver 1202, an OFDM transmitter 1204, a processor 1206, user I/O devices 1208, and memory 1210 coupled together via a bus 1211 over which the various elements may interchange data and information.

Receiver 1202 is coupled to a receive antenna 1203 over which the wireless terminal may receive downlink signals from a plurality of base stations. Receiver 1202 receives first, second and third signals (1248, 1254, 1260) from first, second, and third base station, respectively. Received (first signal 1248, second signal 1254, third signal 1260) is each associated with a carrier frequency (1252, 1258, 1264), where at least two of the carrier frequencies are different. For example, carrier 1252 corresponding to first signal 1248 may be different than carrier 1258 corresponding to second signal 1254.

In some embodiments, the receiver 1202 receives one or more of base station broadcast power level information 1282 and geographic location information 1276. Receiver 1202 includes a decoder 1216 for decoding received downlink signals.

Transmitter 1204 is coupled to transmit antenna 1205 via which the wireless terminal 2200 transmits uplink signals to base stations. In some embodiments, the transmitter transmits channel gain ratio reports 1274, e.g., sets including at least two channel gain ratios, to a base station. Transmitter 1204 includes an encoder 1218 for encoding uplink signals. In some embodiments, the same antenna is used for the receiver 1202 and transmitter 1204. User I/O devices 1208, e.g., microphone, keypad, keyboard, camera, mouse, switches, display, speaker, etc., are used by the operator of wireless terminal 2200 to input/output user data and information, control various user applications, and direct implementation of various functions, e.g., initiate a call.

Memory 1210 includes routines 1212 and data/information 1214. The processor 1206, e.g., a CPU, executes the routines 1212 and uses the data/information 1214 in memory 1210 to control the operation of the wireless terminal 2200 and implement methods of the present invention. Routines 1212 includes a communications routine 1220 and wireless terminal control routines 1222. The communications routine 1220 implements the various communications protocols used by the wireless terminal 2200. Wireless terminal control routines 1222 include a power measurement module 1224, a selection module 1226, a relative transmission power determination module 1228, a channel gain ratio module 1230, and a geographic area determination module 1232. In some embodiments, the wireless terminal control routines 1222 also include a channel gain ratio reporting module 1231.

Power measurement module 1224 measures the received power of signals from a plurality of base stations. Different received signals may use different carrier frequencies, and the power measurement module, in some embodiments, controls switching of the carrier setting in the receiver 1202, e.g., to tune in to the different potential carriers at different times. In some embodiments, the receiver 1202 includes multiple RF chains, e.g., supporting two carriers to be tuned in and received simultaneously. In some embodiments, the received signals on which power is being measured are OFDM beacon signals. An OFDM beacon signal is a high power single tone signal over a time interval of less than three OFDM transmission symbol period. The transmission power of the beacon tone is at least 3 dB higher than the average per-tone transmission power of the transmitted signal. Power measurement module 1224 measures the received power of: one or more signals from received signals from first base station 1242, one or more signals from received signals from second base station 1244, and one or more signals from received signals from third base station 1246. Selection module 1226 designates: one of the measured received signals from the first base station 1242 as the first signal 1248, one of the measured received signals from the second base station 1244 as the second signal 1254, and one of the measured received signals from the third base station 1246 as the third signal 1260. Thus, power measurement module 1224 measures the received power of first signal 1248, second signal 1254, and third signal 1260 obtaining received power (1250, 1256, 1262), respectively.

As described above, selection module 1226 selects from among a plurality of measured received signals, when at least one of said first second, and third base stations support multiple downlink carriers, which signals to designate as said first, second and third signals. For example, received signals from first base station 1242 may include signals from a plurality of carriers, e.g., two or three, and the selection module 1226 selects to use the received signal having the highest reliability, e.g., the strongest, as the first signal 1248. Similar selections may be performed regarding the received signals from the second base station 1244 and received signals from third base station 1246. In some embodiments, the selection module 1226 is implemented such that at least two of said first signal 1248, second signal 1254 and third signal 1260 are selected to correspond to different carrier frequencies.

Relative transmission power determination module 1228 determines relative transmission powers between first, second, and third signals, e.g., relative determined transmission power information 1266. In some embodiments, power information is stored in the wireless terminal corresponding to each supported carrier for each base station, e.g., power information 1296, which is used by relative transmission power determination module 1228. In some embodiments, one or more base stations broadcast power level information, e.g., signaling transmission power levels associated with individual base stations and/or relative transmission power levels with respect to another base station or a reference level. Such broadcast power level information is received by WT 2200 as received BS broadcast power level information 1282 and used by relative transmission power level determination module 1228.

Channel gain ration module 1230 determines channel gain ratios 1268 with at least two channel gain ratios being determined corresponding to a geographic location determination, said at least two channel gain ratios including a first channel gain ratio 1270 and a second channel gain ratio 1272. The first channel gain ratio is a channel gain ratio between a first channel gain and a second channel gain. The first channel gain is a channel gain between the first base station and the wireless terminal; the second channel gain is a channel gain between the second base station and the wireless terminal. A third channel gain is a channel gain between the third base station and the wireless terminal. The second channel gain ration may be a channel gain ratio between the first and third channel gains or a channel gain ratio between the second and third channel gains.

In some embodiments, the WT 2200 includes a channel gain ratio reporting module 1231 which formats the ratios (1270, 1271) into a channel gain ratio report or reports 1274 which are transmitted via transmitter 1204 and directed to a network node, e.g., a base station or core node, which performs geographic location processing operations.

Geographic area determination module 1232 determines a geographic area corresponding to the set of at least two determined channel gain ratios. In some embodiments, the receiver 1202 receives geographic location information 1276 based upon the transmitted first and second gain ratio reports 1274 and processes the received geographic location information 1276 to obtain a geographic area location estimation for the wireless terminal, WT location area information 1278. In some other embodiments, the geographic area determination module 1232 uses stored BS location information, e.g., a set of BS location information including BS 1 location information 1298, in conjunction with the determined channel gain ratios 1270,1272, to determine a geographic area location estimation for the wireless terminal, WT location area information 1278.

Data/information 1214 includes a terminal identifier 1234, base stations identification information 1236, data 1238, user/device/session/resource information 1240, received signals from first base station 1242, received signals from second base station 1244, received signals from third base station 1246, relative determined transmission power information 1266, determined channel gain ratios 1268, wireless location area information 1278, and system base station information 1284. Terminal identifier 1234 is, e.g., a base station assigned user identifier corresponding to the base station being used as the attachment point. BSs identification information 1236 includes information identifying first, second, and third base station, from which downlink signals are being received and processed to perform a location determination, e.g., from among the plurality of base stations in the wireless communications system. Data 1238 is, e.g., user data/information such as voice data, audio data, image data, text data, file data, etc. Data 1238 includes data exchanged in communications sessions and application data. User/device/session/resource information 1240 includes information identifying peer nodes in a communications session with WT 2200, device specific information such as device control settings, communications session information, routing information, addressing information, and air link resource information, e.g., uplink and downlink channel segments allocated to WT 2200.

Received signals from first base station 1242, which may include received signals corresponding to one or more carriers, includes a first signal 1248 which has a received power 1250 and an associated carrier 1252. Received signals from second base station 1244, which may include receive signals corresponding to one or more carriers, includes a second signal 1254 which has a received power 1256 and an associated carrier 1258. Received signals from third base station 1246, which may include received signals corresponding to one or more carriers, includes a third signal 1260 which has a received power 1262 and an associated carrier 1264. Relative determined transmission power information 1266 is an output of module 1228 and is used as an input by channel gain ratio module 1230. Determined channel gain ratios 1268 includes at least ratio 1 1270 and ratio 2 1272, and is an output of channel gain ratio module 1230. WT location area information 1278 is an output of geographic area determination module 1232.

System information 1284 includes a plurality of sets of base station information (BS 1 information 1286, . . . , BS M information 1288). BS 1 information 1286 includes beacon information 1290, pilot information 1292, and frequency/timing information 1294. In some embodiments, BS 1 information 1286 includes one or more of power information 1296, and base station location information 1298. Beacon information includes information associated with the beacons used for each carrier for BS 1, e.g., tone used, OFDM symbol transmission time period index value in a repetitive downlink timing structure. Pilot information 1292 includes information associated with the pilot signaling used by the BS1, e.g., a slope value and/or an offset value associated with a pilot signaling pattern used by BS1 allowing BS1 to be distinguished among a plurality of base stations. Frequency/timing information 1294 includes information identifying the carrier frequencies used by BS1, information identifying the tone block, number of tones, tone hopping pattern, and repetitive timing structure used by BS1, e.g., including OFDM symbol transmission time period information and information of grouping of multiple OFDM symbol transmission time periods. Power information 1296 includes stored power level and/or relative power level information associated with transmitted signals using each of the carriers of BS1. In some embodiments, different downlink carriers from the same base station have different transmission power levels. Power information 1296 can also include relative power level information relating BS 1 transmission power levels to other BSs in the system, e.g., adjacent base stations. BS location information 1298 includes information identifying the location of base station 1.

In some embodiments, the wireless terminal 2200 includes one or more of: channel gain ratio reports 1274, received geographic location information 1276, and received base station broadcast power level information 1282. Channel gain ratio reports 1274 are generated by channel gain ratio reporting module 1231, using the determined channel gain ratios 1268. Received geographic location information 1276 is a response from a network node, e.g., a base station or core node which performs location determination processing using transmitted channel gain ratio reports 1274. Received base station broadcast power level information 1282 includes individual base station transmission power level information and/or relative base station transmission power level information with respect to another base station or with respect to a reference level.

The methods of the present invention have generally been described in the context of non-sectorized base stations. The techniques of the present invention are equally applicable to systems which implement sectorized base stations and/or cells. In sectorized systems each sector transmitter can be treated as discussed above with regard to base station transmitters and the device's location can be identified from received signals from different sector transmitters. In sectorized systems implementing the invention, each sector will normally transmit using multiple carrier frequencies having different power levels. The signals from multiple sector transmitters can be measured, e.g., sector transmitters corresponding to the same or different basestations/cells, just as in the case of a single base station transmitter; the sector transmitters can be identified; and the location determined from base station/sector location information being used in combination with signal strength information.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s)

While described in the context of an OFDM system, at least some of the methods and apparatus of the present invention, are applicable to a wide range of communications systems including many other frequency division multiplexed systems and non-OFDM and/or non-cellular systems. Many of the methods and apparatus of the present invention are also applicable in the context of a multi-sector multi-cell wireless communications system.

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method for use with a wireless device, the method comprising:
   receiving from a first base station a first plurality of signals corresponding to different carrier frequencies, wherein at least two of said first plurality of signals are transmitted at different power levels, and wherein one of said first plurality of signals is selected as a first signal based, at least in part, on an indication of received signal reliability;
   receiving at least a second signal from a second base station, said first and second signals corresponding to first and second carrier frequencies, respectively, said first and second carrier frequencies being different;
   determining at least two channel gain ratios based, at least in part, on information indicative of corresponding predetermined relative transmission powers of said first and second signals, said at least two channel gain ratios comprising a first channel gain ratio associated with said first base station and a second channel gain ratio associated with said second base station; and
   determining a geographic area location estimate based, at least in part, on geographic location information which corresponds to said at least two determined channel gain ratios.

2. The method of claim 1, wherein said one of said first plurality of signals comprises a strongest one of said first plurality of signals.

3. The method of claim 1, wherein receiving said second signal further comprises:
   receiving from said second base station a second plurality of signals corresponding to different carrier frequencies; and
   selecting a strongest one of said second plurality of signals as said second signal.

4. The method of claim 3, wherein at least two of said second plurality of signals are transmitted at different power levels.

5. The method of claim 1, further comprising:
   obtaining said information indicative of corresponding relative transmission powers of at least said first and second signals.

6. The method of claim 5 further comprising:
   receiving broadcast information associated with a transmission power level used by said first base station for at least said first signal; and
   receiving broadcast information associated with a transmission power level used by said second base station for at least said second signal.

7. The method of claim 1, wherein determining said geographic area location estimate further comprises:
   transmitting at least said at least two determined channel gain ratios to a network node; and
   in response, receiving from said network node information associated with said geographic area location estimate.

8. The method of claim 1, wherein said first and second signals comprise orthogonal frequency division multiplexing (OFDM) signals.

9. A wireless device comprising:
   a receiver to receive a plurality of signals comprising at least: from a first base station a first plurality of signals corresponding to different carrier frequencies, wherein at least two of said first plurality of signals are transmitted at different power levels, and wherein one of said first plurality of signals is selected as a first signal based, at least in part, on an indication of received signal reliability, and from a second base station a second signal, said first and second signals corresponding to first and second carrier frequencies respectively, said first and second carrier frequencies being different;
   a power measurement module to measure a corresponding received power of said first and second signals;
   a relative transmission power determination module to determine relative transmission powers between said first and second signals;
   a channel gain ratio module to determine at least two channel gain ratios based, at least in part, on information indicative of corresponding predetermined relative transmission powers of said first and second signals, said at least two channel gain ratios comprising a first channel gain ratio associated with said first base station and a second channel gain ratio associated with said second base station; and
   a geographic area determination module to determine a geographic area location estimate for said wireless device based, at least in part, on geographic location information corresponding to said at least two determined channel gain ratios.

10. The wireless device of claim 9, further comprising:
    a selection module to select said first and second signals from among said received plurality of signals.

11. The wireless device of claim 10, said selection module to select at least one of said first and second signals based, at least in part, on a received signal strength.

12. The wireless device of claim 9, said receiver to receive broadcast information based upon the transmitted first and second gain ratios.

13. The wireless device of claim 9, further comprising:
memory to store base station location information, and said received first and second signals comprising OFDM beacon signals.

14. The wireless device of claim 9, further comprising:
a transmitter to transmit first and second channel gain ratios to a base station over an uplink wireless communications channel, and wherein
said receiver to receive said geographic location information based, at least in part, on said transmitted first and second gain ratios.

15. The wireless device of claim 9, further comprising:
memory to store base station location information, and wherein
said geographic area determination module to determine said geographic area location estimate based further, at least in part, on said base station location information.

16. A method for use with a wireless device, the method comprising:
receiving from a first base station a first plurality of signals corresponding to different carrier frequencies, wherein at least two of said first plurality of signals are transmitted at different power levels, and wherein one of said first plurality of signals is selected as a first signal based, at least in part, on an indication of received signal reliability;
receiving at least a second signal from a second base station, said first and second signals corresponding to first and second carrier frequencies, respectively, said first and second carrier frequencies being different;
determining at least two channel gain ratios, said at least two channel gain ratios comprising a first channel gain ratio associated with said first base station and a second channel gain ratio associated with said second base station, said first channel gain ratio comprising a ratio of a first channel gain to a second channel gain, said first channel gain comprising a channel gain between said first base station and said wireless device, said second channel gain comprising a channel gain between said second base station and said wireless device; and
determining a geographic area location estimate based, at least in part, on geographic location information which corresponds to said at least two determined channel gain ratios.

17. A wireless device comprising:
a receiver to receive a plurality of signals comprising at least: from a first base station a first plurality of signals corresponding to different carrier frequencies, wherein at least two of said first plurality of signals are transmitted at different power levels, and wherein one of said first plurality of signals is selected as a first signal based, at least in part, on an indication of received signal reliability, and from a second base station a second signal, said first and second signals corresponding to first and second carrier frequencies respectively, said first and second carrier frequencies being different;
a power measurement module to measure a corresponding received power of said first and second signals;
a relative transmission power determination module to determine relative transmission powers between said first and second signals;
a channel gain ratio module to determine at least two channel gain ratios, said at least two channel gain ratios comprising a first channel gain ratio associated with said first base station and a second channel gain ratio associated with said second base station, said first channel gain ratio comprising a ratio of a first channel gain to a second channel gain, said first channel gain comprising a channel gain between said first base station and said wireless device, said second channel gain comprising a channel gain between said second base station and said wireless device; and
a geographic area determination module to determine a geographic area location estimate for said wireless device based, at least in part, on geographic location information corresponding to said at least two determined channel gain ratios.

18. An apparatus for use in a wireless device, the apparatus comprising:
means for receiving a plurality of signals comprising: from a first base station a first plurality of signals corresponding to different carrier frequencies, wherein at least two of said first plurality of signals are transmitted at different power levels, and wherein one of said first plurality of signals is selected as a first signal based, at least in part, on an indication of received signal reliability; and from a second base station a second signal, said first and second signals corresponding to first and second carrier frequencies, respectively, said first and second carrier frequencies being different; and
means for determining at least two channel gain ratios based, at least in part, on information indicative of corresponding predetermined relative transmission powers of said first and second signals, said at least two channel gain ratios comprising a first channel gain ratio associated with said first base station and a second channel gain ratio associated with said second base station; and
means for determining a geographic area location estimate for said wireless device based, at least in part, on geographic location information which corresponds to said at least two determined channel gain ratios.

19. The apparatus of claim 18, wherein said one of said first plurality of signals comprises a strongest one of said first plurality of signals.

20. The apparatus of claim 18, further comprising:
means for receiving, from said second base station, a second plurality of signals corresponding to different carrier frequencies; and
means for selecting a strongest one of said second plurality of signals as said second signal.

21. The apparatus of claim 20, wherein at least two of said second plurality of signals are transmitted at different power levels.

22. The apparatus of claim 18, further comprising:
means for obtaining said information indicative of corresponding relative transmission powers of at least said first and second signals.

23. The apparatus of claim 22, further comprising:
means for receiving broadcast information associated with a transmission power level used by said first base station for at least said first signal; and
means for receiving broadcast information associated with a transmission power level used by said second base station for at least said second signal.

24. The apparatus of claim 18, further comprising:
means for transmitting at least said at least two determined channel gain ratios to a network node; and
means for receiving, from said network node, information associated with said geographic area location estimate.

25. The apparatus of claim 18, wherein said first and second signals comprise orthogonal frequency division multiplexing (OFDM) signals.

26. An apparatus for use in a wireless device, the apparatus comprising:
means for receiving a plurality of signals comprising: from a first base station a first plurality of signals corresponding to different carrier frequencies, wherein at least two of said first plurality of signals are transmitted at different power levels, and wherein one of said first plurality of signals is selected as a first signal based, at least in part, on an indication of received signal reliability; and from a second base station a second signal, said first and second signals corresponding to first and second carrier frequencies, respectively, said first and second carrier frequencies being different; and
means for determining at least two channel gain ratios, said at least two channel gain ratios comprising a first channel gain ratio associated with said first base station and a second channel gain ratio associated with said second base station, said first channel gain ratio comprising a ratio of a first channel gain to a second channel gain, said first channel gain comprising a channel gain between said first base station and said wireless device, said second channel gain comprising a channel gain between said second base station and said wireless device; and
means for determining a geographic area location estimate for said wireless device based, at least in part, on geographic location information which corresponds to said at least two determined channel gain ratios.

27. An article comprising:
a non-transitory data storage medium having stored thereon a plurality of computer implementable instructions implementable by a processor in a wireless device to:
obtain a plurality of signals comprising: a first plurality of signals corresponding to different carrier frequencies received from a first base station, wherein at least two of said first plurality of signals are transmitted at different power levels, and wherein, one of said first plurality of signals is selected as a first signal based, at least in part, on an indication of received signal reliability; and a second signal from a second base station, said first and second signals corresponding to first and second carrier frequencies, respectively, said first and second carrier frequencies being different; and
determine at least two channel gain ratios based, at least in part, on information indicative of corresponding predetermined relative transmission powers of said first and second signals, said at least two channel gain ratios comprising a first channel gain ratio associated with said first base station and a second channel gain ratio associated with said second base station;
obtain on geographic location information which corresponds to said at least two determined channel gain ratios; and
determine a geographic area location estimate for said wireless device based, at least in part, on said geographic location information.

28. The article of claim 27, said computer implementable instructions being further implementable to select said first and second signals from among said received plurality of signals.

29. The article of claim 28, said computer implementable instructions being further implementable to select at least one of said first and second signals based, at least in part, on a received signal strength.

30. The article of claim 27, said computer implementable instructions being further implementable to obtain broadcast information including at least one of a base station transmission power level and a base station relative transmission power level.

31. The article of claim 27, said received first and second signals comprising OFDM beacon signals.

32. The article of claim 27, said computer implementable instructions being further implementable to:
initiate transmission of first and second channel gain ratios to a base station over an uplink wireless communications channel.

33. The article of claim 27, said computer implementable instructions being further implementable to:
obtain at least a portion of said geographic location information from a base station.

34. The article of claim 27, said computer implementable instructions being further implementable to:
obtain base station location information; and
determine said geographic area location estimate based further, at least in part, on said base station location information.

35. An article comprising:
a non-transitory data storage medium having stored thereon a plurality of computer implementable instructions implementable by a processor in a wireless device to:
obtain a plurality of signals comprising: a first plurality of signals corresponding to different carrier frequencies received from a first base station, wherein at least two of said first plurality of signals are transmitted at different power levels, and wherein one of said first plurality of signals is selected as a first signal based, at least in part, on an indication of received signal reliability; and a second signal from a second base station, said first and second signals corresponding to first and second carrier frequencies, respectively, said first and second carrier frequencies being different; and
determine at least two channel gain ratios, said at least two channel gain ratios comprising a first channel gain ratio associated with said first base station and a second channel gain ratio associated with said second base station, said first channel gain ratio comprising a ratio of a first channel gain to a second channel gain, said first channel gain comprising a channel gain between said first base station and said wireless device, said second channel gain comprising a channel gain between said second base station and said wireless device;
obtain on geographic location information which corresponds to said at least two determined channel gain ratios; and
determine a geographic area location estimate for said wireless device based, at least in part, on said geographic location information.

* * * * *